United States Patent
Hughes

(10) Patent No.: US 10,277,639 B2
(45) Date of Patent: *Apr. 30, 2019

(54) MANAGING DIGITALLY-STREAMED AUDIO CONFERENCE SESSIONS

(71) Applicant: BRITISH TELECOMMUNICATIONS PUBLIC LIMITED COMPANY, London (GB)

(72) Inventor: Peter James Hughes, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/715,624

(22) Filed: Sep. 26, 2017

(65) Prior Publication Data
US 2018/0091563 A1    Mar. 29, 2018

(30) Foreign Application Priority Data
Sep. 28, 2016 (EP) ..................................... 16191247

(51) Int. Cl.
*H04M 3/22* (2006.01)
*H04M 3/56* (2006.01)
(Continued)

(52) U.S. Cl.
CPC ...... *H04L 65/1083* (2013.01); *H04L 65/4053* (2013.01); *H04M 3/2236* (2013.01);
(Continued)

(58) Field of Classification Search
CPC .................. H04L 65/1083; H04L 65/4053
See application file for complete search history.

(56) References Cited

U.S. PATENT DOCUMENTS

| 7,436,822 B2 | 10/2008 | Lee et al. |
| 8,031,857 B2 | 10/2011 | Singh |

(Continued)

FOREIGN PATENT DOCUMENTS

| EP | 1 526 706 | 4/2005 |
| EP | 2 785 007 | 10/2014 |
| JP | 2000-49948 | 2/2000 |

OTHER PUBLICATIONS

Extended Search Report for EP16191247, dated Dec. 2, 2016, 5 pages.

(Continued)

*Primary Examiner* — Charles C Jiang
*Assistant Examiner* — Kyaw Z Soe
(74) *Attorney, Agent, or Firm* — Nixon & Vanderhye PC

(57) ABSTRACT

Methods, apparatus and systems are disclosed for managing digitally-streamed audio communication sessions between user devices (7a, 7b, 7c). The user devices are configured to send digitally-streamed data (21) indicative of received audio contributions from respective participants in a multiple-participant audio communication session to a multiple-participant audio communication session controller (30) for processing and onward streaming of data (22) indicative of the received audio contributions from the session controller (30) to one or more other user devices (7a, 7b, 7c) for conversion to audio representations for respective other participants of the received audio contributions. The data (21, 22) is streamed between the session controller and the respective user devices in accordance with one or more digital streaming profiles having one or more adjustable digital streaming parameters.

19 Claims, 13 Drawing Sheets

Monitoring, delay estimation and parameter adjustment process

(51) Int. Cl.
*H04L 29/06* (2006.01)
*H04L 29/08* (2006.01)
(52) U.S. Cl.
CPC .............. *H04M 3/568* (2013.01); *H04L 67/30* (2013.01); *H04M 2201/18* (2013.01)

(56) References Cited

U.S. PATENT DOCUMENTS

| | | | | |
|---|---|---|---|---|
| 2005/0088981 | A1* | 4/2005 | Woodruff | H04M 3/56 370/260 |
| 2007/0072605 | A1* | 3/2007 | Poczo | H04W 8/18 455/432.2 |
| 2008/0144794 | A1* | 6/2008 | Gardner | H04M 3/56 379/202.01 |
| 2008/0147388 | A1* | 6/2008 | Singh | G10L 15/1822 704/226 |
| 2009/0150151 | A1* | 6/2009 | Sakuraba | G10L 21/028 704/246 |
| 2012/0265524 | A1 | 10/2012 | McGowan | |
| 2014/0078938 | A1* | 3/2014 | Lachapelle | A61B 18/245 370/260 |
| 2014/0297811 | A1* | 10/2014 | Stevens | H04L 65/60 709/219 |

OTHER PUBLICATIONS

Search Report for GB1616497.2, dated Mar. 13, 2017, 6 pages.
Extended European Search Report dated Jan. 23, 2018 issued in corresponding EP Application No. 17191483.1 (8 pgs.).
U.S. Appl. No. 15/715,820, filed Sep. 26, 2017 (36 pgs.).
Office Action dated Nov. 30, 2017 issued in co-pending U.S. Appl. No. 15/715,820 (14 pgs.).
Office Action dated May 9, 2018 issued in co-pending U.S. Appl. No. 15/715,820, inventor: Hughes (14 pages).

* cited by examiner

Figure 1 - The Turn-Taking Process

Figure 2 - Conference System

Figure 3 - Conference Server

Figure 4 - Analysis Unit

Figure 5 - False Start Detector

Figure 6 - Conference Control Unit

Figure 7 - Conference Terminal

Figure 8 - Conversation showing Turn Construction Units (TCUs) and Transition Relevant Places (TRPs)

Figure 9 - Interruption occurring after the TRP allows estimate of delay

Figure 11 - Monitoring, delay estimation and parameter adjustment process

Figure 12 - False starts in conversations

MANAGING DIGITALLY-STREAMED AUDIO CONFERENCE SESSIONS

This application claims priority to EP Patent Application No. 16191247.2 filed 28 Sep. 2016, the entire contents of which is hereby incorporated by reference.

TECHNICAL FIELD

The present invention relates to methods, apparatus and systems for streamed communication. In particular, preferred embodiments relate to methods, apparatus and systems for managing digitally-streamed audio-communication sessions.

BACKGROUND TO THE INVENTION AND PRIOR ART

Conversation Analysis (CA) is a branch of linguistics which studies the way humans interact. Since the invention is based on an understanding of interactions between participants in conversations, and how the quality of the interactions is degraded by transmission delay, we first note some of the knowledge from Conversation Analysis.

In a free conversation the organisation of the conversation, in terms of who speaks when, is referred to as 'turn-taking'. This is implicitly negotiated by a multitude of verbal cues within the conversation and also by non-verbal cues such as physical motion and eye contact. This behaviour has been extensively studied in the discipline of Conversation Analysis and leads to useful concepts such as:

The Turn Constructional Unit (TCU), which is the fundamental segment of speech in a conversation—essentially a piece of speech that constitutes an entire 'turn'.

The Transition Relevance Place (TRP), which indicates where a turn or floor exchange can take place between speakers. TCUs are separated by TRPs.

These processes enable the basic turn-taking process to take place, as shown in FIG. 1, which will be discussed in more detail later. Briefly, as a TCU comes to an end the next talker is essentially determined by the next participant to start talking. This can be seen for a well-ordered three-participant conversation in FIG. 8 (also discussed in more detail later). All changes in talker take place at a TCU, though if no other participants start talking the original talker can continue after the TCU. This decision process has been observed to lead generally to the following conference characteristics:

(i) Overwhelmingly, only one participant talks at a time.

(ii) Occurrences of more than one talker at a time are common, but brief.

(iii) Transitions from one turn to the next—with no gap or overlap—are common.

(iv) The most frequent gaps between talkers are in the region of 200 ms. Gaps of more than 1 second are rare.

(v) It takes talkers at least 600 ms to plan a one-word utterance and somewhat longer for sentences with multiple words. Combining this figure with the typical gap length implies that listeners are generally very good at predicting an approaching TRP.

Significantly, it is noted here that transmission delay on communication links between the respective conference participants can severely disrupt the turn-taking process because the identity of the next participant to start talking is disrupted by the delay.

Referring to prior art documents, U.S. Pat. No. 7,436,822 (Lee et al) relates to methods and apparatus for estimating transmission delay across a telecommunications network by performing a statistical analysis of conversational behaviour in the network. Certain characteristic events associated with conversational behaviour (such as, for example, alternative silence events, double-talk events, talk-spurt events and pause in isolation events) are identified and measured. Then, based on the proportion of time that these events occur, an estimate of the delay is calculated using a predetermined equation. Illustratively, the equation is a linear regression equation which has been determined experimentally.

United States patent application US2012/0265524 (McGowan) relates to methods and apparatus for visual feedback for latency in communication media, in particular for visualising the latency in a conversation between a local speaker and at least one remote speaker separated from the local speaker by a communication medium.

U.S. Pat. No. 8,031,857 (Singh) relates to methods and systems for changing communication quality of a communication session based on a meaning of speech data. Speech data exchanged between clients participating in a communication session is parsed. A meaning of the parsed speech data is determined for identifying a service quality indicator for the communication session. An action is performed to change a communication quality of the communication session based on the identified service quality indicator.

European patent application EP1526706 (Xerox Corporation) relates to methods of communication between users including receiving communications from communication sources, mixing communications for a plurality of outputs associated with the communication sources, analysing conversational characteristics of two or more users, and automatically adjusting floor controls responsive to the analysis. It refers to turn-taking analysis in the context of some versions, this being proposed in order to identify, in the context of a "primary meeting" in which there are active subgroups each of which maintains a conversational 'floor', which sub-group a particular talker belongs to, and who is talking with who.

United States patent application US2014/078938 (Lachapelle et al) relates to techniques for handling concurrent speech in a session in which some speech is delayed in order to alleviate speech overlap in the session. A system receives speech data from first and second participants, and outputs the speech of the first participant. The system outputs the speech of the second participant in accordance with an adjustment of the speech of a participant of the session when the speech of the second participant temporally overlaps less than a first predetermined threshold amount of a terminal portion of the speech of the first participant. The system drops the speech of the second participant when the speech of the second participant temporally overlaps more than the first predetermined threshold amount of the terminal portion of the speech of the first participant. The system may adjust the speech of a participant of the session by delaying output of the speech of the second participant.

Japanese patent application JP2000049948 relates to a speech communication technique which aims to enhance the operability of a communication system such as a telephone conference system and a speech device by facilitating the recognition of the voice of an opposite party who is a centre of a conversation.

SUMMARY OF THE INVENTION

The present inventor has recognised that, from the disruptive effect that network delays and other issues on communication links between respective conference participants can have on the turn-taking process—even if the participants are unaware of or do not understand the disruption, let alone of the cause thereof—data reflecting the disruption of the turn-taking process can be used as an indicator of such network delays and other issues, and can therefore be used to trigger action to mitigate against such adverse effects caused by such network delays and other issues, and action to improve user experience and smooth-running of the turn-taking process in the context of an in-progress audio-conference.

According to a first aspect of the invention, there is provided a method of managing a digitally-streamed audio communication session between a plurality of user devices, the user devices being configured to send digitally-streamed data indicative of received audio contributions from respective participants in a multiple-participant audio communication session to a multiple-participant audio communication session controller for processing and onward streaming of data indicative of said received audio contributions from said session controller to one or more other user devices for conversion to audio representations for respective other participants of said received audio contributions, the data being streamed between the session controller and the respective user devices in accordance with one or more digital streaming profiles having one or more adjustable digital streaming parameters; the method comprising:

identifying, from streamed data received by said session controller in respect of successive audio contributions from respective participants, time measures indicative of start-times and end-times in respect of said audio contributions;

determining, from time measures identified in respect of a plurality of audio contributions, respective disparity measures, each disparity measure being determined in respect of a preceding audio contribution from one participant and an immediately-succeeding audio contribution from another participant, the disparity measure in respect of a preceding audio contribution and an immediately-succeeding audio contribution being indicative of a disparity between the end-time identified in respect of the preceding audio contribution and the start-time identified in respect of the immediately-succeeding audio contribution; and adjusting one or more digital streaming parameters of the digital streaming profile in accordance with which data is being streamed between the session controller and at least one of the respective user devices in dependence on said disparity measures.

According to preferred embodiments, the identifying of time measures indicative of start-times and end-times in respect of audio contributions may be performed in dependence on analysis including one or more of the following:

automated voice activity detection;
automated speech recognition;
automated spectrum analysis.

According to preferred embodiments, the respective disparity measures determined in respect of a preceding audio contribution from one participant and an immediately-succeeding audio contribution from another participant may be indicative of gaps and/or overlaps between the respective audio contributions.

According to preferred embodiments, the adjusting of said one or more digital streaming parameters in accordance with which data is being streamed between the session controller and one or more user devices may be performed in dependence on one or more of the following:

the presence of one or more disparity measures indicative of one or more disparities above a predetermined threshold;

the frequency with which disparity measures indicative of disparities above a predetermined threshold have occurred;

the size of one of more disparities indicated by one or disparity measures.

According to preferred embodiments, the adjusting of said one or more digital streaming parameters may comprise adjusting one or more digital streaming parameters affecting one or more of the following:

the data-rate of the data streaming;
the content of the data streamed;
the coding and/or decoding of the data streamed;
the route via which the data is streamed.

According to preferred embodiments, the method may further comprises identifying, from streamed data received by said session controller in respect of audio contributions from respective participants, count measures indicative of the number of participants making audio contributions at different times. With such embodiments, the method may further comprise adjusting one or more digital streaming parameters of the digital streaming profile in accordance with which data is being streamed between the session controller and at least one of the respective user devices in dependence on said count measures.

The audio communication session may be an audio-visual communication session, in which case the contributions from respective participants may be audio-visual contributions.

According to preferred embodiments, the method may further comprise adjusting one or more audio parameters in respect of the data being streamed from the session controller to at least one of the user devices whereby to affect the audio representation provided by said at least one user device to a participant using said at least one user device, the adjusting of said one or more audio parameters being performed in dependence on said disparity measures.

According to a second aspect, there is provided communication session control apparatus for managing a digitally-streamed audio communication session between a plurality of user devices, the user devices being configured to send digitally-streamed data indicative of received audio contributions from respective participants in a multiple-participant audio communication session to said communication session control apparatus for processing and onward streaming of data indicative of said received audio contributions from said communication session control apparatus to one or more other user devices for conversion to audio representations for respective other participants of said received audio contributions, the data being streamed between the communication session control apparatus and the respective user devices in accordance with one or more digital streaming profiles having one or more adjustable digital streaming parameters; the communication session control apparatus comprising one or more processors operable to perform a method according to the first aspect.

According to a third aspect, there is provided a communication session system comprising a communication session control apparatus according to the second aspect and a plurality of user devices configured to send digitally-streamed data indicative of received audio contributions from respective participants in a multiple-participant audio communication session to said communication session control apparatus.

According to a fourth aspect, there is provided a computer program element comprising computer program code to, when loaded into a computer system and executed thereon, cause the computer to perform the steps of a method according to the first aspect.

The various options and preferred embodiments referred to above in relation to the first aspect are also applicable in relation to the second, third and fourth aspects.

According to preferred embodiments, audio-streams of respective participants' audio contributions to an in-progress audio-conference session are analysed in order to identify gaps and/or overlaps between successive contributions of different participants (either of which can indicate that transmission delays or other factors are adversely affecting the in-progress communication session), and if the presence, frequency or sizes of the gaps and/or overlaps indicate such adverse effects, parameters affecting the streaming of audio data between the participants may be adjusted in order to decrease such adverse effects or otherwise improve user experience (e.g. reducing audio-quality or increasing bandwidth on one or more of the in-use links in order to decrease transmission delays on those links).

Method and systems are disclosed which are operable to detect delays and other audio quality impairments affecting an in-progress audio-conference session and to modify system components and/or parameters affecting the transmission of audio data between participants in order to reduce the impact of those delays or other audio quality impairments on the perceived quality of the audio-conference session.

In some cases, the delays or other audio impairments can be determined or inferred by inspection of the digital transmission systems, e.g. data errors, packet loss, packet timestamps etc. However, in a more general scenario this may not be not possible due to the range of access technologies. For example participants can access via PSTN (Public Switched Telephone Network), Mobile GSM (Global System for Mobile communications), or VoIP ("Voice over Internet Protocol"), and there may be tandem links.

Preferred embodiments use the interactivity behaviour of the conference participants to estimate the delays in the audio-streams to each participant. The manner in which such estimates are made and used is based on an understanding of participant "turn-taking" from the linguistic discipline of "Conversation Analysis". Such delay estimates may then be used to modify transmission, audio representation and system components during the session.

Preferred embodiments may measure delay on communication links to each participant, but can also measure other indications of audio quality.

Preferred embodiments may be particularly useful in situations where signal routing is complex and timing data is not available from transport layer data such as packet headers.

Preferred embodiments may be used for performance monitoring, with analysis processing being based at the conference bridge or at the client.

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

With reference to the accompanying figures, methods and apparatus according to a preferred embodiment will be described. In this embodiment, the analysis and other processing steps are performed in a conference server or "bridge" as shown in the associated figures, but it will be appreciated that some or all steps may in fact be performed in one or more of the conference terminals (or "user devices"), or in one or more other processing modules.

Figure 1:
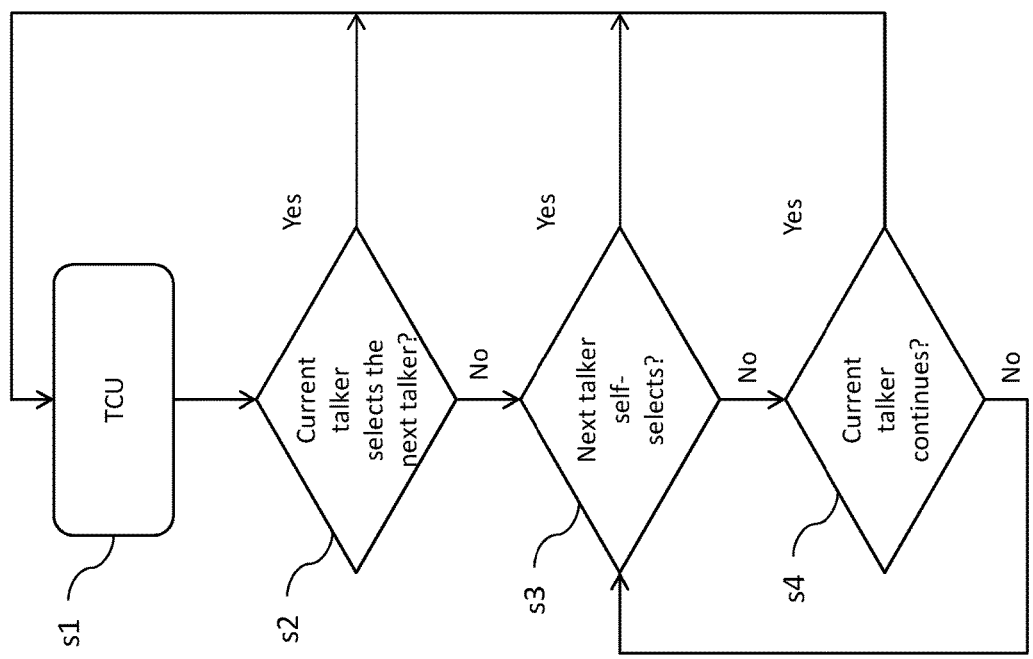
FIG. 1 illustrates a basic conversational turn-taking procedure.

As mentioned earlier, FIG. 1 illustrates a basic conversational turn-taking procedure. At stage s1, a Turn Construction Unit (TCU) of a participant is in progress. This TCU may come to an end by virtue of the current participant/talker stopping talking having explicitly selected the next talker (stage s2), in which case the procedure returns to stage s1 for a TCU of the selected next talker. If the current talker doesn't select the next talker, another participant may self-select (stage s3), with the procedure then returning to stage s1 for a TCU of the self-selected next talker. If no other participant self-selects at stage s3, the current talker may continue with the procedure returning to stage s1 for another TCU from the same talker. If the current talker doesn't continue, the procedure returns from stage s4 to stage s3 until another talker does self-select. Essentially, the next talker is determined by the next participant to start talking.

Figure 8:
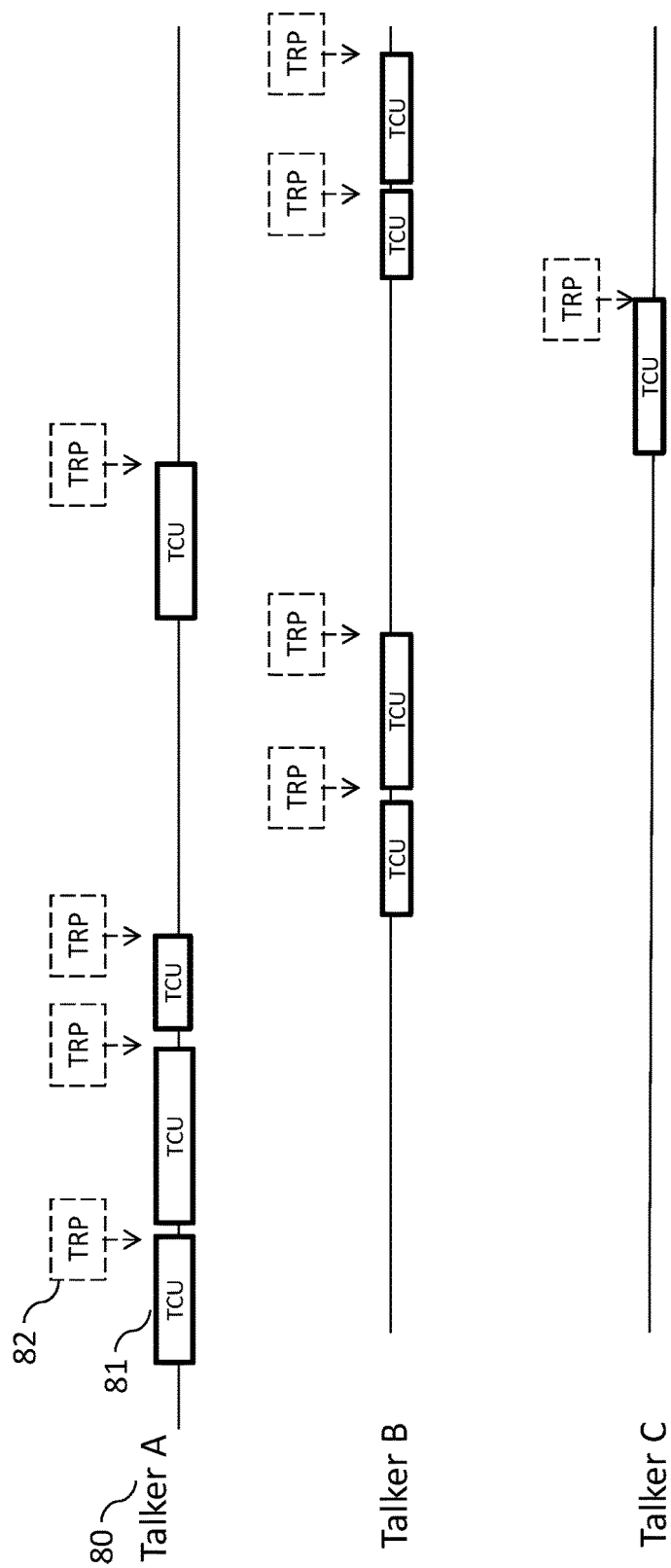
FIG. 8 shows a typical conversation consisting of three talkers, where the turn-taking takes place at some, but not all, transition relevant places (TRPs)

FIG. 8 shows an excerpt from a typical conversation consisting of three participant talkers 80 each producing one or more TCUs 81 each ended by a Transition Relevant Place (TRP) 82. It will be seen that the process of turn-taking may occur at some, but not necessarily all, of the TRPs.

Delays in a Conference System

Figure 2:
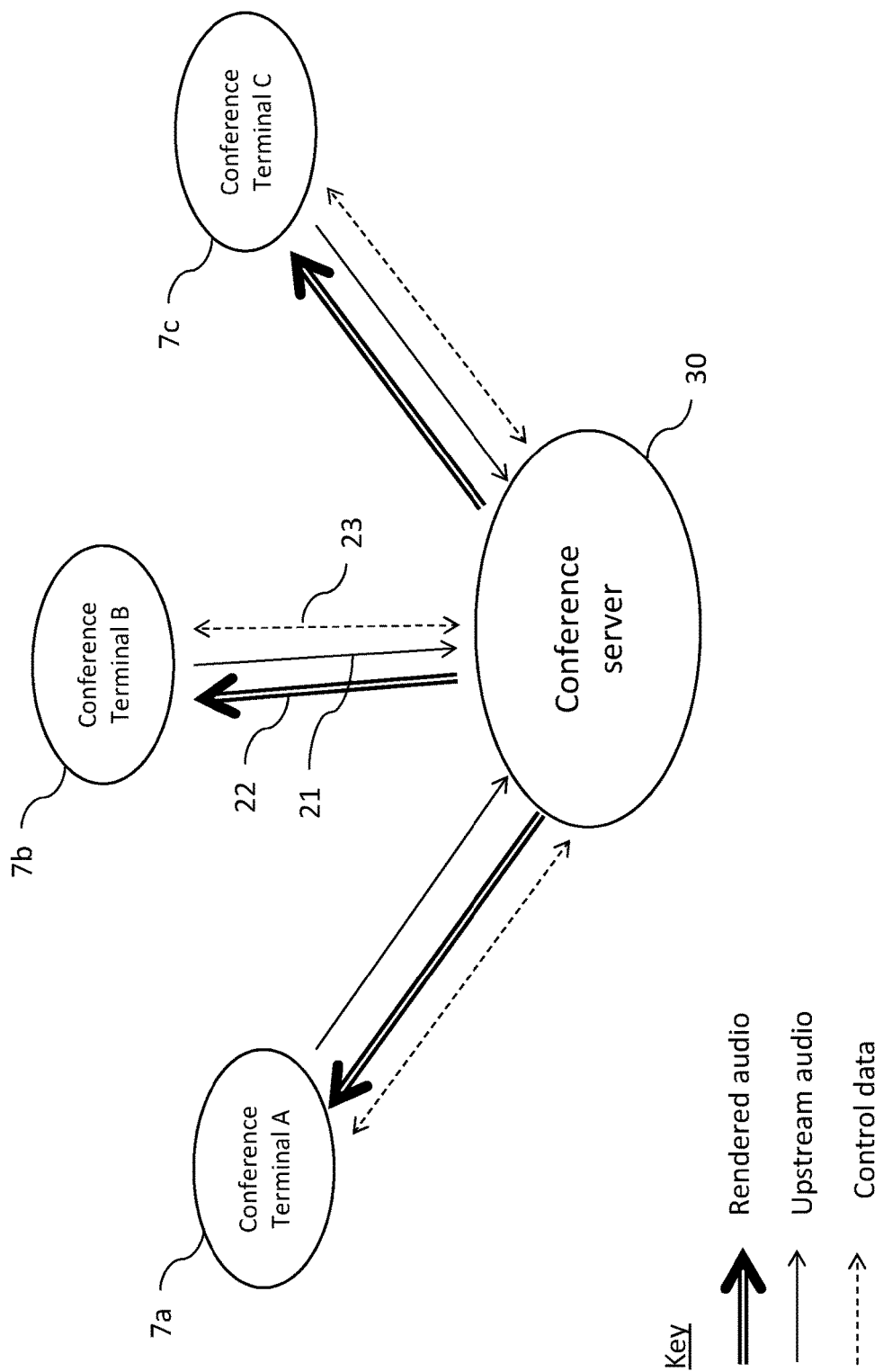
FIG. 2 is a high-level diagram of a conference system.

A top-level diagram of a conference system is shown in FIG. 2. A plurality of conference terminals 7a, 7b, 7c are connected to a centralised conference server 30 via bi-directional data links that carry a combination of single-channel (generally upstream) audio data 21, multi-channel (generally downstream) audio data 22, and additional (generally bi-directional) digital control and/or reporting data 23. We note the following:

The data links could consist of a number of tandem links using a range of different transmission technologies and possibly include additional processing such as encryption, secure pipes and variable length data buffering. The routing of the data could be changed to links suffering a lower delay.

In this example, separate arrows are used to indicate single-channel upstream audio data 21 indicative of audio contributions of conference participants being transmitted/streamed from the respective conference terminals 7 to the conference server 30, and to indicate multi-channel downstream audio data 22 indicative of rendered audio data resulting from the processing and combining at the conference server 30 of the audio contributions of conference participants, the rendered audio data being transmitted/streamed from the conference server 30 to the respective conference terminals 7. It will be understood that the paths for the respective types of data may in fact be via the same or different servers, routers or other network nodes (not shown). Similarly, the paths taken by the control data 23 may be via the same or different servers, routers or other network nodes as the paths taken by the audio data.

Figure 3:
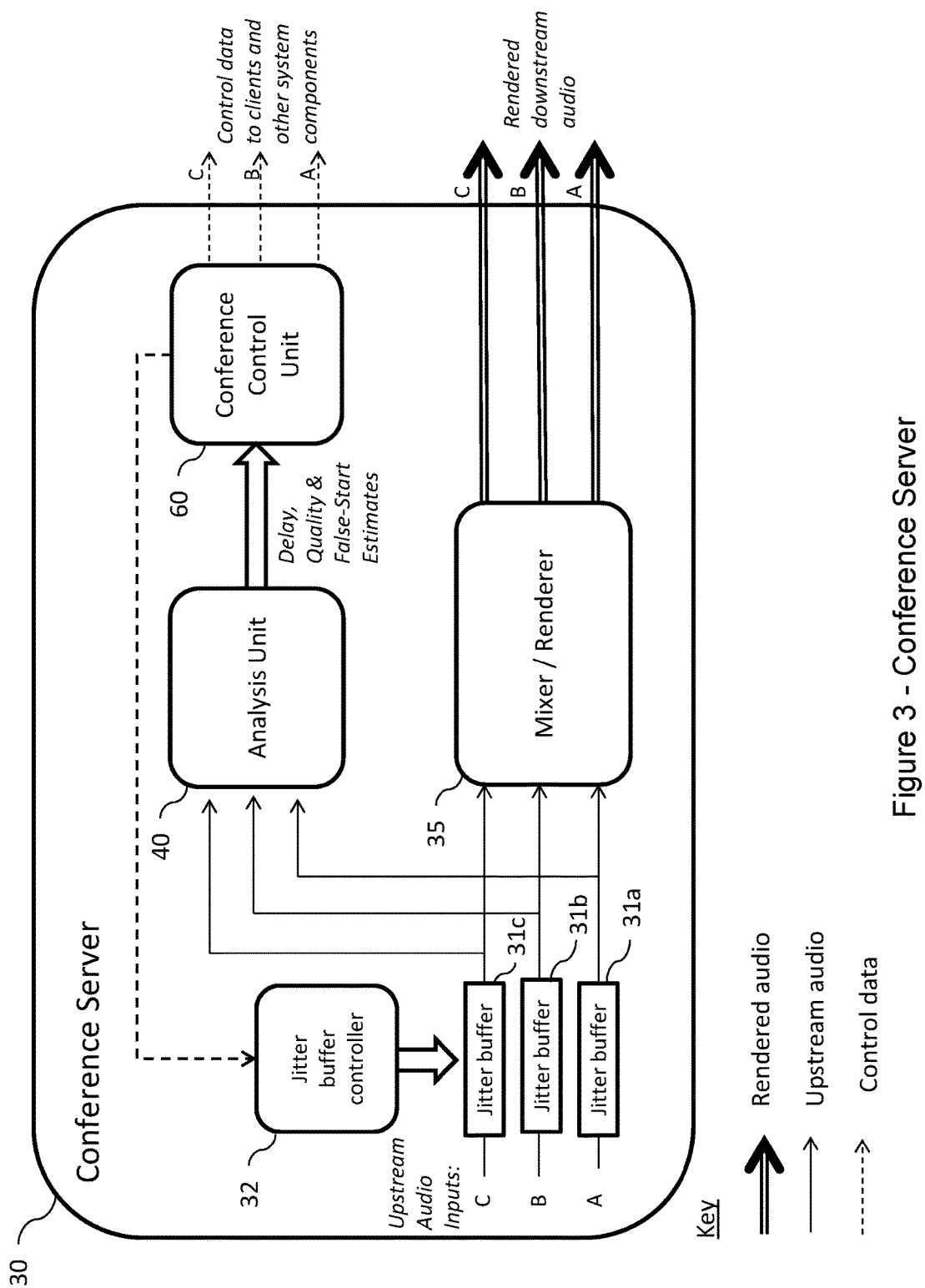
FIG. 3 shows a possible server architecture which could be configured for use in performing a method according to a preferred embodiment.

An example of a Conference Server is shown in FIG. 3. This shows a possible architecture of a conference server 30 which could be used or configured for use in performing a method according to a preferred embodiment. Upstream audio inputs from conference clients 7 (i.e. 7a, 7b and 7c in FIG. 2, discussed later with reference to FIG. 7) may be passed through jitter buffers 31 (i.e. 31a, 31b and 31c in FIG. 3) before being passed to an Analysis Unit 40 and on to a Conference Control Unit 60 (both discussed later), and to a Mixer/Renderer 35. The jitter buffers 31 may be used to prevent data packets being discarded if they suffer excessive delay as they pass through the data link. The length of each jitter buffer may be determined by a jitter buffer controller 32 using an optimisation process which takes into account the measured jitter on the data packets and the packet loss rate, for example.

The mixer/renderer 35 receives the upstream audio data from the conference terminals 7 (via jitter buffers 31 where these are present), performs signal processing to combine and render the audio signals and distributes the mixed/rendered signal back to the conference terminals 7. The analysis unit 40 takes the upstream audio data, extracts delay and other performance indicators, and passes them to the conference control unit (CCU) 60 shown in FIG. 6.

Figure 6:
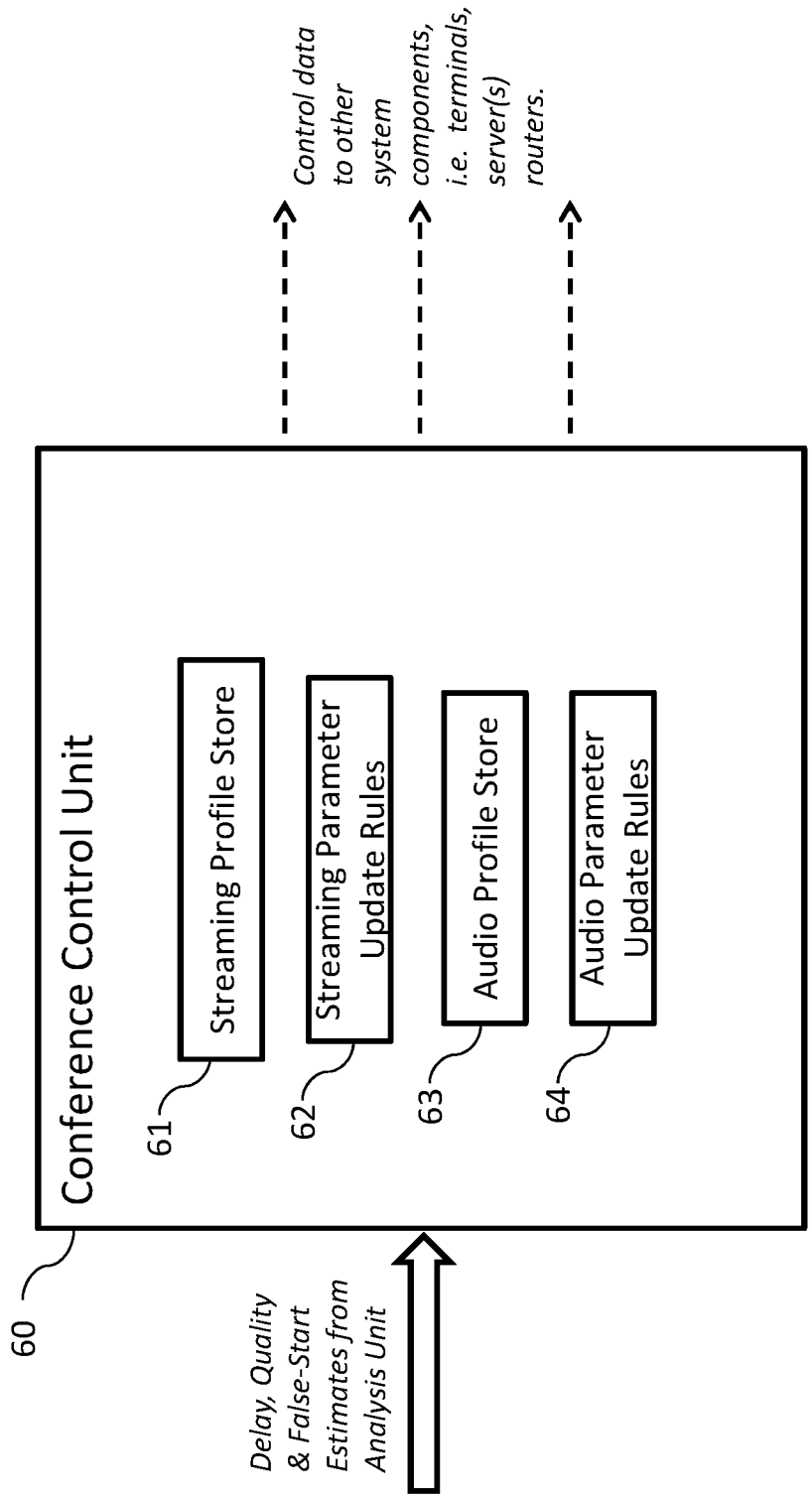
FIG. 6 illustrates the Conference Control Unit of FIG. 3.

FIG. 6 illustrates the Conference Control Unit 60 of FIG. 3. This is a processor or processor module configured to implement a set of controls to other system components (e.g. providing instructions to server(s), routers etc. in order to adjust streaming parameters, and/or providing instructions to be implemented on the conference server 30 itself or on the individual conference terminals 7 relating to adjustments to audio parameters, for example) based on system-specific rules applied to data such as speech-quality, transmission delay data and other timing data with a view to mitigating adverse effects, and to improving user experience and perception. It may comprise memories 61, 63 for storing existing streaming profiles in respect of paths to respective conference terminals and audio profiles for the respective conference terminals themselves, and processing modules 62, 64 for implementing rules in respect of the streaming and audio profiles, the results of which may then be sent as control data to the appropriate system components, i.e. the conference terminals 30, server(s) and/or routers on the paths thereto and therefrom, etc. It will be appreciated that in order to affect the audio representation provided by a conference terminal to a participant using it, it may be possible to adjust audio parameters whereby to affect the rendered audio data prior to that data being streamed to the participant, or to adjust audio parameters to be sent as control data to the conference terminal, at which they may be used in respect of the audio representation of the data after it has been streamed from the conference server 30 to the appropriate conference terminal 7.

Figure 7:
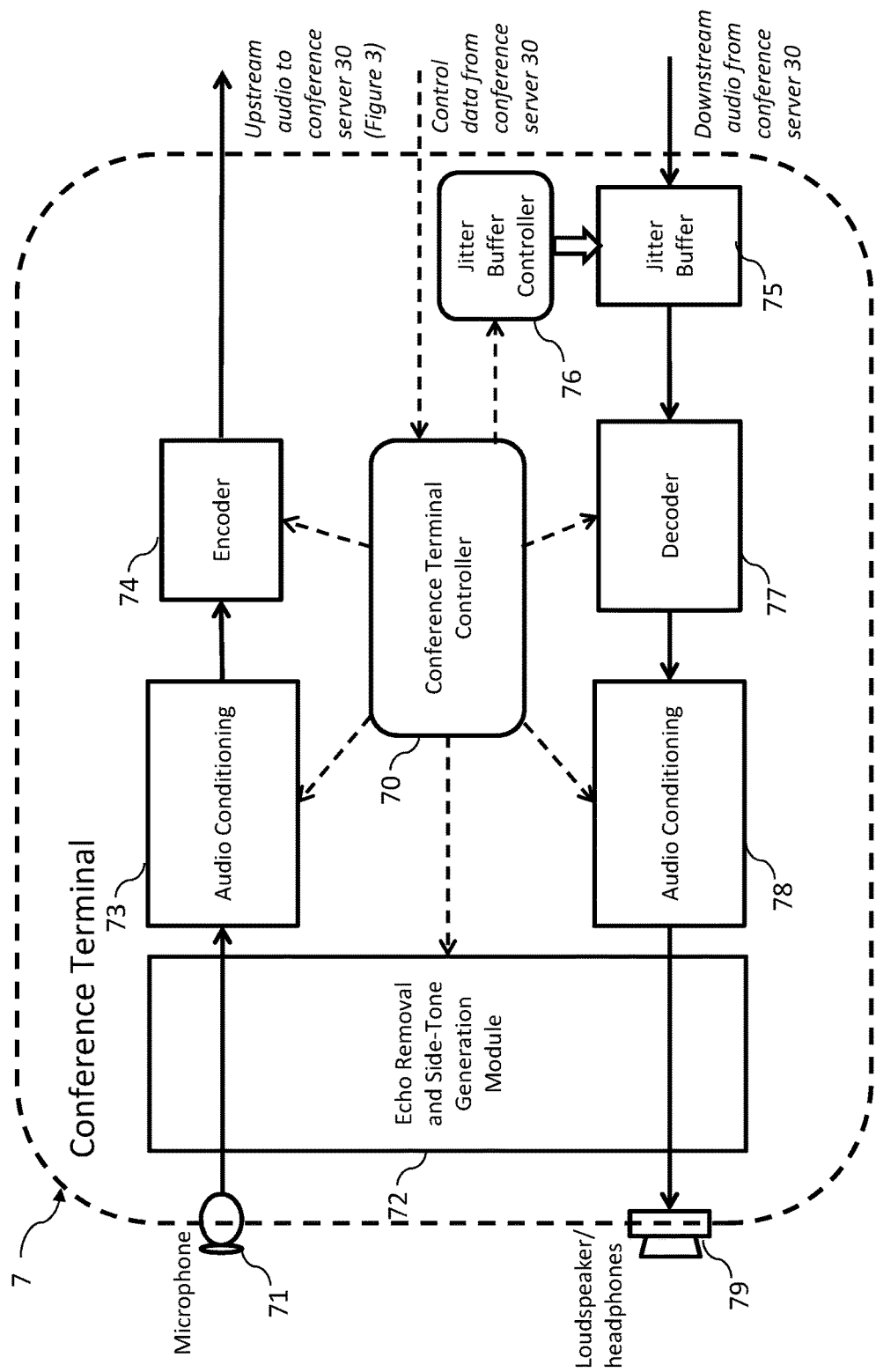
FIG. 7 shows a possible Conference Terminal module of FIG. 2.

A possible conference terminal architecture is shown in FIG. 7. The conference terminal 7 shown has a microphone 71 which picks up the acoustic signal from the local participant(s) and produces an electrical signal in respect thereof. This may then be passed through an Echo Removal and Side-Tone Generation Module 72 for an (optional) echo removal process, via an Audio Conditioning processor 73 if necessary, and via an Encoder 74 which may encode the signal for efficient transmission before being sent via an interface (not illustrated) as upstream data to the Conference Server 30. The conference terminal 7 also has an interface (not illustrated, but which may be the same interface as is used for providing upstream data to the Conference Server 30, or may be a separate interface) for receiving downstream data from the Conference Server 30. This data may pass through a jitter buffer 75 with an associated jitter buffer controller 76 (serving similar or corresponding functions to those in the Conference Server 30) before being decoded by Decoder 77 into an audio signal. This may be passed through a second Audio Conditioning processor 78 (which may be the same processor as is used for the upstream signal) and replayed to the local listener(s) using either loudspeakers or headphones 79. As in the conference controller 30, the length of the jitter buffer may be determined by the jitter buffer controller 76 using an optimisation process which takes into account the measured jitter on the data packets and the packet loss rate. The processing in each of the individual blocks in the conference terminal 7 can be modified by a Conference Terminal Controller 70 which responds to instructions from the conference server (the instructions or "control data" being indicated by dashed arrows).

The Analysis Unit—Identifying TCU and TRPs

Figure 4:
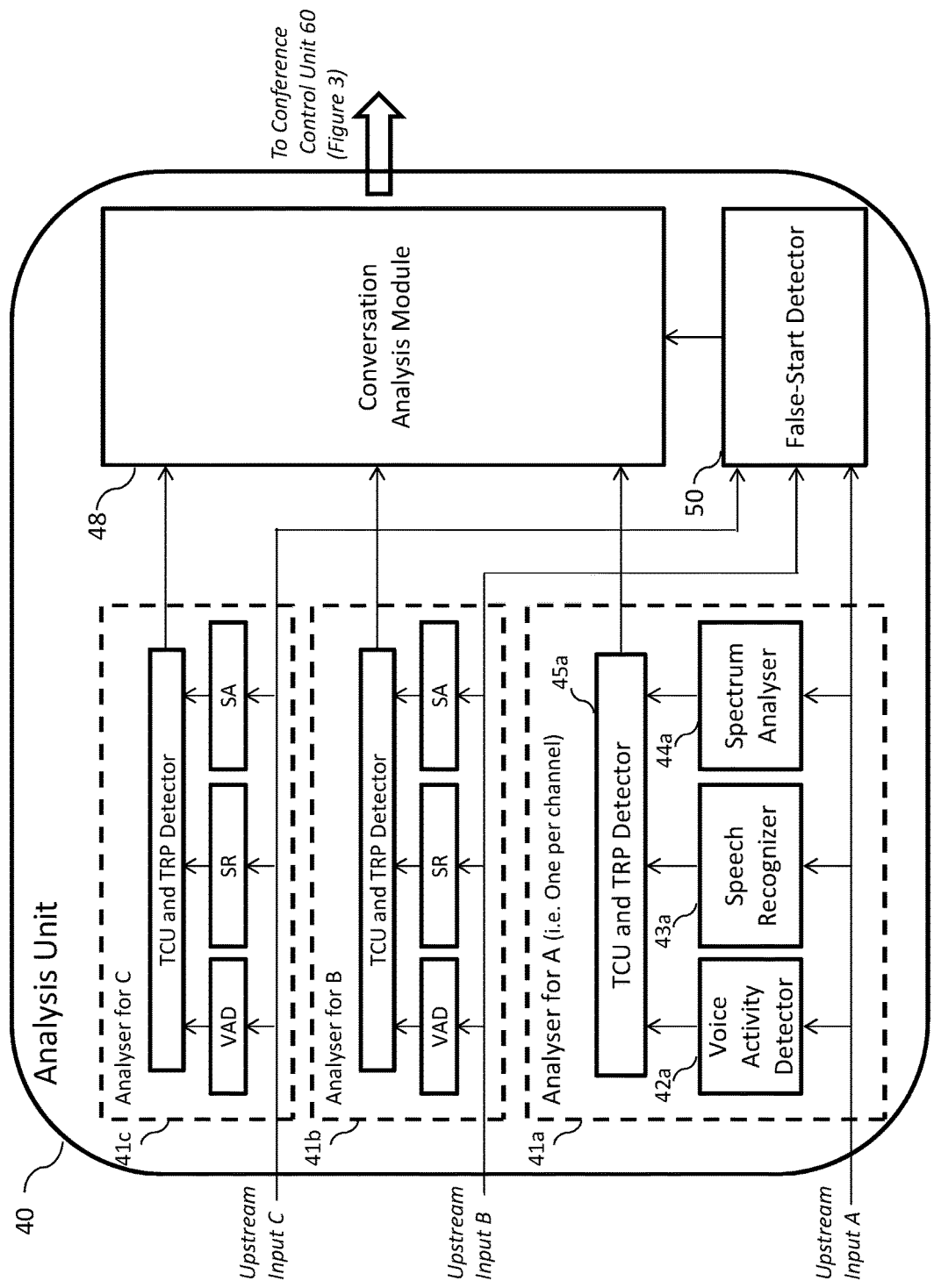
FIG. 4 shows an example of the architecture and functionality of the analysis unit shown as part of FIG. 3.

FIG. 4 shows an example of the architecture and functionality of the Analysis Unit 40 shown as part of the Conference Server of FIG. 3. The primary function of the Analysis Unit 40 is to identify TCU and TRPs.

The analysis unit of FIG. 4 receive an upstream input from each of the conference terminals 7. In FIG. 4, upstream inputs are shown arriving from each of three conference terminals (i.e. 7a, 7b and 7c), although there may of course be more than just three. Each upstream input is shown being passed into an analyser 41 dedicated to that channel, so three analysers (41a, 41b and 41c) are shown. It will be understood that while the inputs from respective conference terminals 7 are generally analysed separately, the hardware involved in the analysis may be shared or specific to the different channels.

The modules within an analyser will be explained with reference to Analyser 41a, shown as the analyser for the upstream input A (received from conference terminals 7a). The modules within Analyser 41a have been given reference numerals—the corresponding modules within "Analyser for B" 41b and "Analyser for C" 41c have not been given reference numerals in order to avoid unnecessary additional complexity and clutter in the figure.

In this embodiment, the "Analyser for A" 41a (and, correspondingly, each other analyser) consists of a Voice Activity Detector (VAD) 42a, a Speech Recognizer (SR) 43a and a Spectrum Analyser (SA) 44a, each of which performs its named function, discussed in more detail below. The outputs of these units are fed into a "TCU and TRP Detector" 45*a* which uses the data received to detect Turn Construction Units (TCUs) and Transition Relevance Places (TRPs) in the signal on that input.

Data relating to the TCUs and TRPs detected by the analysers 41 may then be provided to a Conversation Analysis Module 48 (possibly as well as other data such as "False Start" data from a False-Start Detector 50 (discussed later), for example). The function of the Conversation Analysis Module 48 is to analyse the timings of the TCUs and TRPs detected by the respective analysers 41, which relate to the audio contributions of respective participants, and determine or estimate from such data disparities (i.e. gaps and/or overlaps) between the successive audio contributions from different participants. It may also determine or estimate other types of delay and/or other system quality parameters using Conversation Analysis principles. Data from the Conversation Analysis Module 48 may then be provided to the Conference Control Unit 60 referred to above.

Time measures identified in respect of a respective TCUs from different participants may reveal both "positive" and "negative" disparities (i.e. gaps and overlaps between successive TCUs). Both types of disparity may be indicative of network delays and/or other factors affecting interactions between participants, and may therefore indicate a potential issue to be resolved in order to improve the smooth running of the conversation in progress and/or the perceived quality and/or user experience thereof. The participants themselves may not be aware of such network delays and other factors, or that the smooth running of the conversation or the perceived quality thereof may be being affected by such network delays and other factors—they may in fact believe that other participants are being impolite (as interruptions in a face-to-face discussion or in a live discussion unaffected by such delays may be considered impolite) or genuinely slow to respond. For this reason at least, an automated analysis of such issues during an in-progress audio-conference may reveal issues of which the participants may be unaware or do not understand, and allow changes to be made to mitigate such issues. Various types of changes which may be made as a result of such issues being analysed will be discussed later.

Returning to the issue of TRP detection, it will be appreciated that this may be complex not least because human interaction during any discussion (i.e. digitally-streamed or directly vocal, face-to-face or remote, etc.) itself is generally complex and may be centred around grammatical features of the conversation, consisting of multiple prosodic, syntactic and pragmatic cues. It may be possible to use automated speech recognition techniques in order to identify what is actually being said, then perform semantic or grammatical analysis in an automated manner sufficiently quickly during the interaction, but even In the absence of speech recognition and/or an understanding of what is actually being said, the presence of a TRP can be inferred in an automated manner using other techniques. The presence of a TRP can be inferred in an automated manner using any (or a combination of any) of the following methods, for example:

Temporal analysis of the output of a Voice Activity Detector (VAD) may be used. An approximate indication of the presence of a TRP can be obtained by analysing the output of the VAD. A gap of between 0.5 and 1 second in the speech of a talker is typical at a TRP, so this may be taken as an indication of the presence of a TRP.

Pitch data from a Spectrum Analyser (SA) may be used. The pitch of a talker's speech generally varies over time, typically falling towards the end of a TCU, or rising at the end of the TCU if it is a question, so either of both of these may be taken as an indication of the presence of a TRP.

Analysis of the speech content may be used, based either on full or partial speech recognition.

From a grammatical perspective, TCUs can be divided into four categories: Sentences, phrases, clauses and single words (e.g. "Yes", "No", "There!" etc.). The common feature they all share is a being grammatically or pragmatically complete.

For example, the sentence, "That bus is red" and the response, "So it is!" are both complete TCUs ending in RTPs, and slight falling pitch might be expected in the initial sentence. A similar exchange could use a question-answer form, "Is that bus red?" "Yes it is". In that case we would expect the initial question to exhibit a slight rise in pitch at its end. However, they are all pragmatically complete statements that a suitably-configured natural language speech recogniser would be able to identify.

It should be noted that TRPs are relatively frequent in normal conversations. While a full analysis identifying all TRPs may be possible, embodiments of the invention do not generally require 100% reliability in their detection—obtaining sufficient disparity measures sufficiently quickly and/or efficiently in order to allow a determination to be made as to whether or not any parameters (relating to digital streaming itself, relating to audio representation of streamed data, or otherwise) should be adjusted in respect of any participants, and if so, which, may generally be at least as important a consideration as reliability in relation to the actual proportion of TRPs identified. If desired or required however, subsequent or additional analysis could be performed such that any process dependent on greater reliability would only make use of TRP data in respect of which the TCU/TRP Detector indicated a high level of confidence, or to identify TRPs missed during the initial analysis process.

Figure 10:
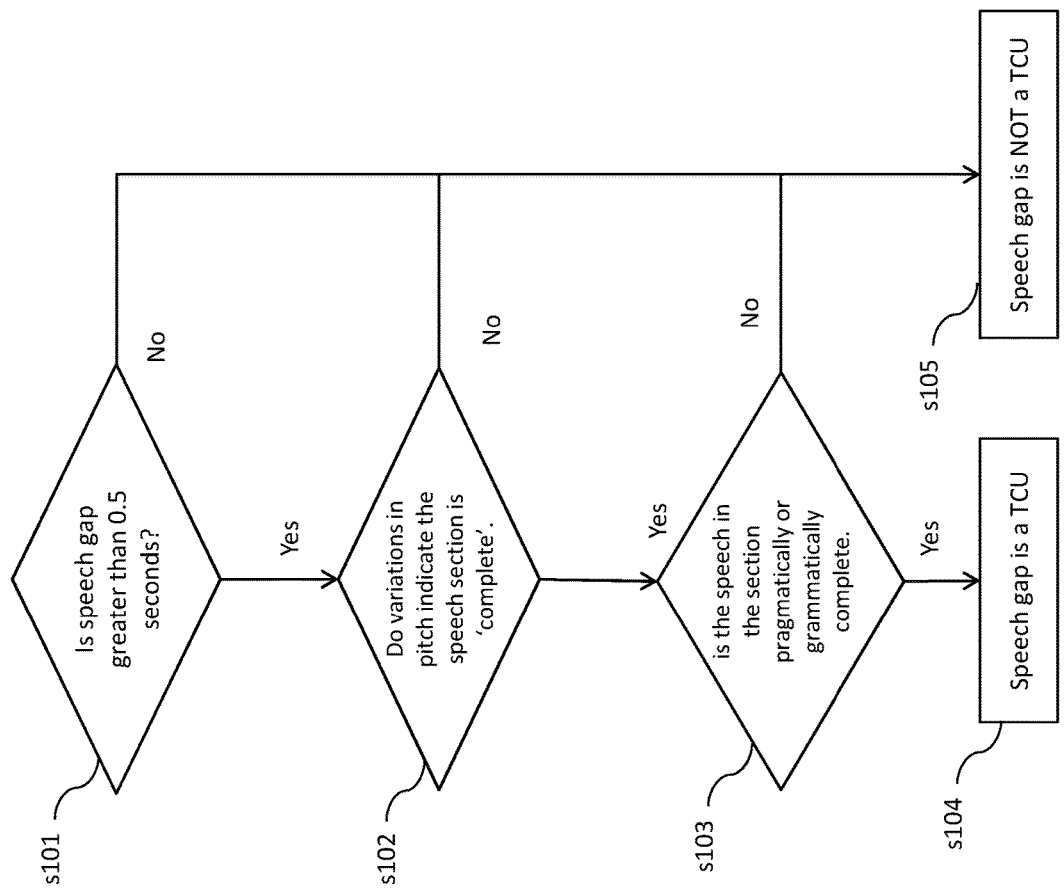
FIG. 10 shows a possible turn construction unit (TCU) detection process.

An example of a possible TRP detection process that could be performed in an analysis unit such as that shown in FIG. 4 is shown by the flow diagram of FIG. 10. Here the outputs of the VADs 42 in the analysis unit 40 are analysed to look for gaps in the discussion that may indicate the end of a TCU and hence a TRP. Typically this might involve looking for gaps greater than 0.5 seconds (although higher or lower thresholds may be used—lower thresholds generally result in more data that can be analysed, whereas higher thresholds generally result in fewer false positives in the data that is analysed). Gaps of less than this are more likely to be simple pauses in speech and we conclude (s105) that the speech gap is not a TRP. It should be noted that there need not be an upper limit to the size of a gap in this context, but an upper limit may be introduced (to allow detection of the current speaker intentionally being silent for a period without intending to invite another participant to start talking, for example). When a potential TRP is detected, in this case due to identification (s101) of a speech gap of more than 0.5 seconds, a pitch detector algorithm is then used in the appropriate spectrum analyser 44, which provides an indication (s102) of whether the TCU is complete based on pitch variations. Further evaluation may also be done using the output of the appropriate speech recogniser 43, which determines (s103) if the suspected TCU appears pragmatically or grammatically complete. If so, it may be concluded (s104) that the speech gap is a TRP.

Other variations of this process can be envisaged. For example the detection processes (s101, s102 and s103) could take place concurrently and a decision made based on the aggregated outputs of each process. Another example might be to make the decision parameters variable in order that they may be adapted to reflect the individual behaviour of the participants. Skilled experts in the field will identify other variations of this process.

Measuring Delays Based on TRP Position

Figure 9:
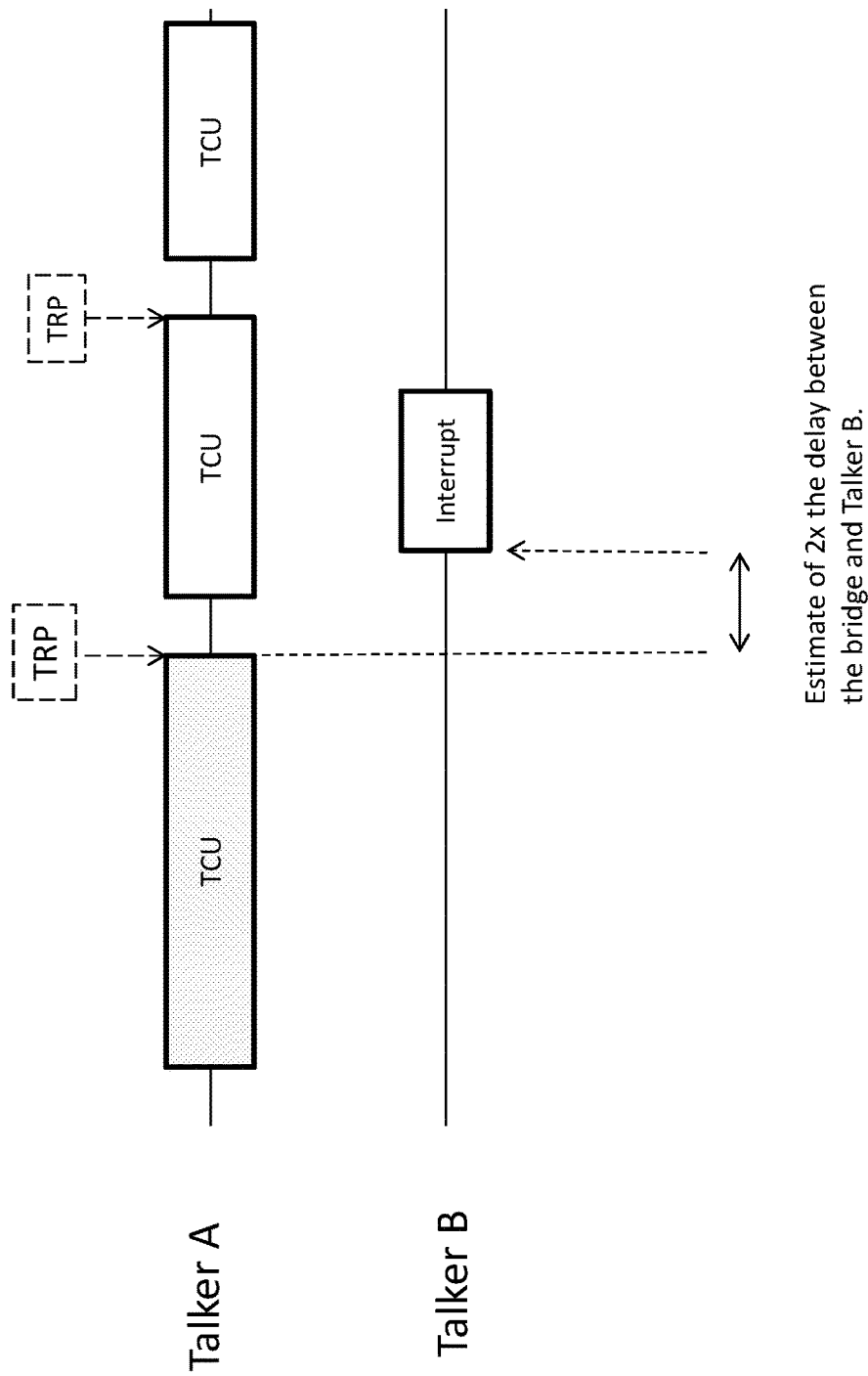
FIG. 9 shows how an interruption from another talker delayed from the transition relevant place can indicate the delay between that talker and the conference bridge.

It will now be explained how delays can be measured based the position of a Transition Relevant Place (TRP). An indication of how delays may be determined is shown in FIG. 9, which illustrates how an interruption from another talker delayed from the TRP can indicate the delay between that talker and the conference bridge.

Here, an attempt to interrupt Current Talker A is made sometime after the TRP is detected, indicating that there is a delay on the link to that participant. The delay measured will consist of the sum of the delays in each direction on that link, plus the reaction time of the participant, which can be estimated from general Conversation Analysis knowledge to be around 200 ms. This will be an instantaneous measurement, and thus may be subject to some error—subsequent statistical analysis of many such measurements could provide a more accurate result.

This principle could be extended to measure the delays to the other conference participants.

False-Start Detection

Figure 12:
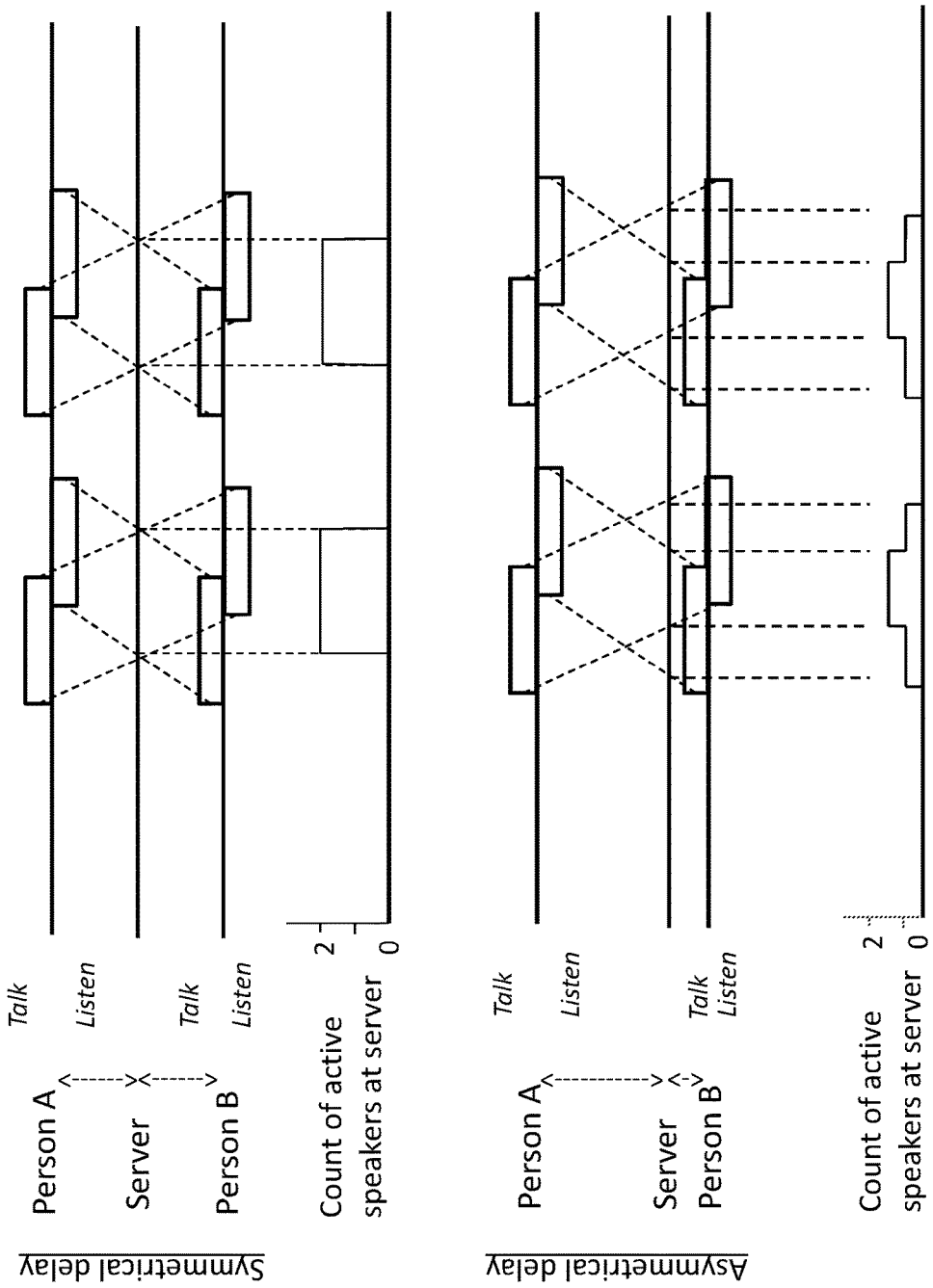
FIG. 12 illustrates how a simple count of the number of active talkers can indicate a 'false start'.

An additional means of measuring delays is to detect so called 'false starts'. This is the name given to short periods of confusion over who has the floor in a conversation. They are often caused by transmission delays in teleconferences. Typical false start activity is shown in FIG. 12, which illustrates how a simple count of the number of active talkers can indicate a 'false start', i.e. a short period of confusion in a conversation where it is uncertain which talker has the floor. They generally involve two talkers starting talking simultaneously (or almost simultaneously), unaware that the other has started talking, then stopping simultaneously (or almost simultaneously) when they realise that the other is talking. It will be understood that false starts are commonly caused by excessive delay in the system, as a result of which one participant may be unaware that another participant has started talking (or think that a previous talker has stopped talking) and start talking themselves, the lack of awareness being mainly due to the fact that, while the other participant had already started talking (or the previous talker had already continued talking), the data stream of that other participant's attempted contribution (or of the previous talker's continued contribution) simply hadn't yet completed both legs of its streamed route via the conference server and reached the other participant.

The top half of FIG. 12 illustrates a situation in which the delay is symmetrical (i.e. the delay between the server and Person A is the same as or similar to the delay between the server and Person B, as signified by the double-ended arrows of similar length. The bottom half of FIG. 12 illustrates a situation in which the delay is asymmetrical (i.e. the respective delays between the server and the respective participants are different, as signified by the double-ended arrows of different length. In each case, the two participants start talking simultaneously, possibly in response to a question from a 3rd participant. Initially they are unaware that the other is speaking and then they both stop talking when they realise the other is talking. This can happen several times until they break the deadlock. In the "symmetrical delay" scenario, the count of active speakers generally oscillates from zero to two and back, whereas an the "asymmetrical delay" scenario, the count of active speakers generally steps up from zero via one to two, then back via one to zero.

Figure 5:
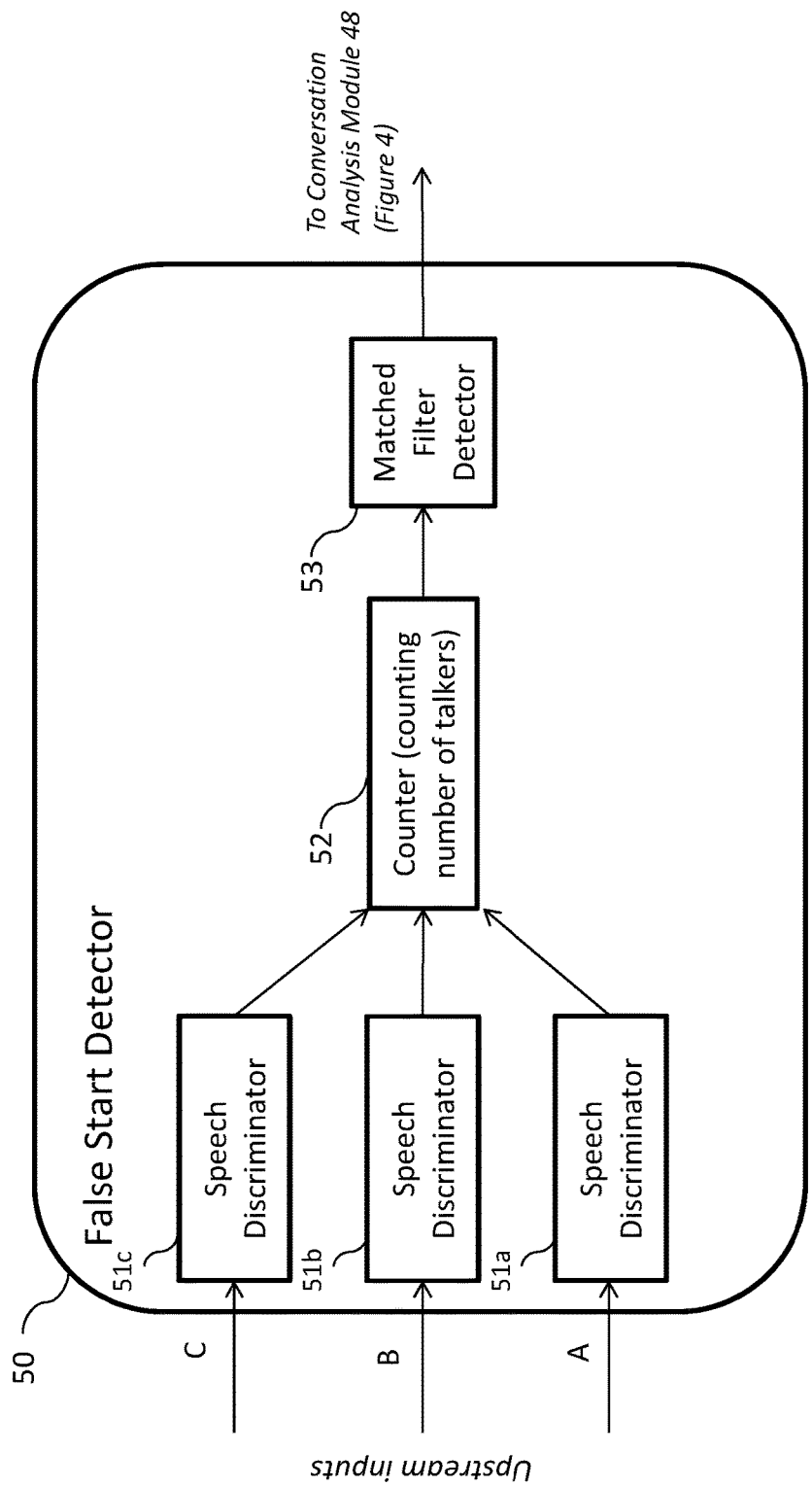
FIG. 5 illustrates a False-Start detector, which may form a part of the analysis unit of FIG. 4.

A method of detecting the above behaviour will be explained with reference to FIG. 5, which illustrates a False-Start Detector 50, which may be used to determine occasions where multiple people start talking at the same time. It may form a part of the Analysis Unit 40 of FIG. 4. In this example, the False-Start Detector 50 includes respective Speech Discriminators 51a, 51b, 51c (generally, 51), each of which may essentially be a specifically-configured form of Voice Activity Detector (VAD) configured to discriminate between grunts, 'uh-huh' sounds etc. and actual words, to determine (for example) if a talker is actually saying anything meaningful. Based on the outputs from the respective Speech Discriminators 51, a counter 52 counts the number of talkers at frequent/regular intervals, and from a consideration of the count against time, characteristic shapes in the number of talkers can be detected using a simple matched filter detector 53, for example. A sudden increase of more than one talker followed by a matching decrease, such as that shown in the top half of FIG. 12, could be deemed to indicate a false start, for example, suggesting symmetrical delay. Alternatively, the presence of possible asymmetrical delay could be detected from a stepped increase and decrease, such as that shown in the bottom half of FIG. 12.

Using Disparity Data to Optimise the Conference System

Having explained how respective disparity measures relating to gaps and/or overlaps between audio contributions from different participant may be determined that are indicative of possible network transmission delays having negative effects on an audio-conference, the data obtained can then be used to improve the perceptive performance of the conference and/or to mitigate the effects thereof. This data could be used to identify situations where the transmission delay is excessive (or sufficient to be causing problems, even if the participants are unaware of the cause) or where audio quality is poor, and to take actions such as those described below with reference in particular to FIG. 11.

Figure 11:
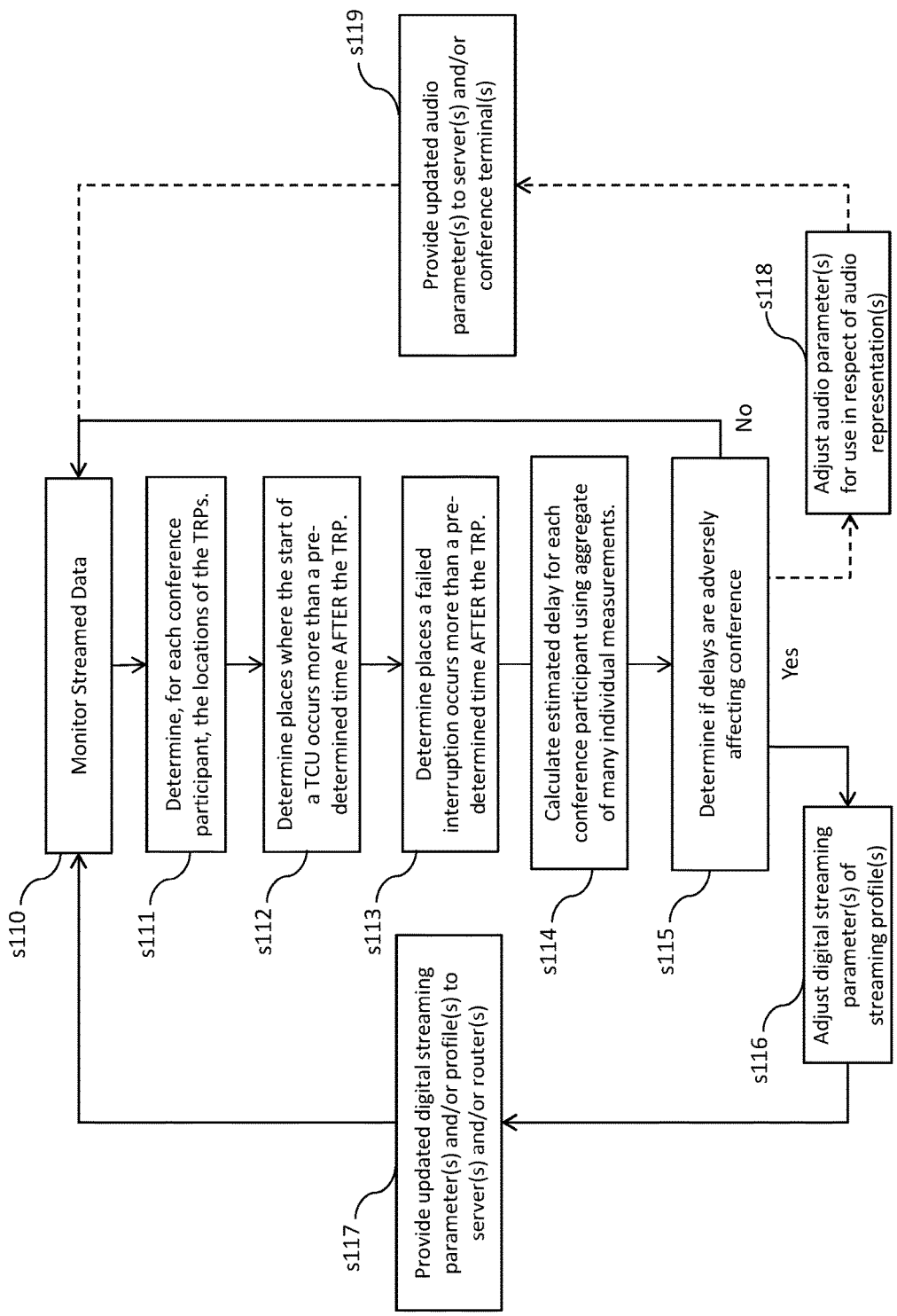
FIG. 11 shows the complete monitoring, delay estimation and parameter adjustment process according to an embodiment of the invention.

FIG. 11 is a flowchart illustrating a method according to an embodiment of the invention for monitoring data being streamed as part of an in-progress audio-conference and determining from analysis of gaps and/or overlaps between successive contributions whether network or other delays are adversely affecting the audio-conference, and if so, making adjustments in order to mitigate such adverse effects.

According to the method described, data 21 being streamed between conference terminals (e.g. terminals 7a, 7b, 7c in FIG. 2) indicative of audio contributions from participants at those terminals who are involved in an audio-conference is received and monitored (step s110) by a conference server (e.g. conference server 30 in FIG. 2). This determines, for each conference participant, the locations of the TRPs (step s111), determine places where the start of a TCU occurs more than a pre-determined time after the TRP (step s112), and determines places where a failed interruption occurs more than a pre-determined time after the TRP (step s113). It then calculates an estimated delay for each conference participant (s114), generally using an aggregate of many individual measurements (if/when these are available). From the data obtained and the determinations made, a determination can then be made as to whether network or other delays or other issues are adversely affecting the audio-conference (step s115). If not, the procedure can return to the "monitoring" step (s110). If it is determined at step s115 that network or other delays or other issues may be adversely affecting the audio-conference, action can then be taken in order to mitigate such affects, including the following:

(i) Elements in or affecting the digital streaming transmission path between the conference server and the conference terminals can be modified; and (ii) Audio parameters affecting the audio representation provided by the user devices to the participants may be adjusted.

In relation to (i), the action may involve adjusting one or more digital streaming parameters (step s116) of the appropriate streaming profiles according to which data is being streamed between the conference server and the respective conference terminals, the adjustments being made in dependence on the disparity measures obtained, and providing any updated digital streaming parameters and/or profiles to the servers and/or routers that may implement them (step s117).

In relation to (ii), the action may involve adjusting one or more audio parameters (step s118) in respect of the data being streamed from the conference server to the respective conference terminals whereby to affect the audio representation provided to the participants, the adjustments being made in dependence on the disparity measures obtained, and providing any updated audio parameters and/or profiles to any servers and/or to the conference terminals that may implement them (step s119).

Adjustment of Streaming Parameters

Looking at more detail into the manner in which digital streaming parameters may be adjusted, it will be appreciated that in a VoIP connection, the data link to each of the conference participants could potentially include additional processing such as secure pipes, data encryption and variable length data buffering. This additional processing may incur additional delay and if the delay on a link measured using the above process appears to be excessive there may be scope for modifying this delay as a trade-off against other processing. A good example of this involves the jitter buffers 31, 75 respectively in the conference server 30 and in the conference terminals 7. These are commonly used in data receivers to alleviate the impact of excessive packet timing jitter on the link. The length of these 'jitter buffers' is typically adjusted automatically based on variations of packet arrival timing, but since the packet header information does not always indicate the true delay on the link it is not always possible to achieve an appropriate optimisation of buffer length and lost packets. The method of delay measurement described above does measure the true delay and we can make a much improved optimisation. This delay data is passed to the jitter buffer controllers 32, 76 in the conference server 30 and conference terminals 7 where it is used in the optimisation process.

Other methods of reducing the delay could include using a different audio codec. Some modern audio codecs provide very efficient coding at the expense of a higher latency. Switching to a very low latency codec such as ITU-T G.722 could save approximately 20 ms, for example.

In some scenarios a more appropriate strategy might be to consider switching to a route which would be subject to lower delays. This may require some network stitching which would preferably not be noticeable to the users as audio artefacts. A possible method for achieving this is set out in European application EP2785007.

If it is suspected that any appreciable or problematic delays are partially attributable to network congestion it may be appropriate to take action to reduce the network traffic on the links in question. This could be done by turning off or reducing the data rate of any video in the conference, for example.

Adjustment of Audio Parameters

Looking at more detail into the manner in which audio parameters may be adjusted, it will be appreciated that it may, to a limited extent at least, be possible to reduce the impact of delay in a conference by modifying the audio experience of the participants. This could include adjusting the volume of the other participants' voices, modifying the volume at which participants hear their own voice (often referred to as 'side-tone'), adding spatial audio effects and reverberation. In a preferred embodiment the level of the side-tone could be reduced, making the local participant less likely to continue speaking if they realise somebody else is talking, for example.

Figure 13:
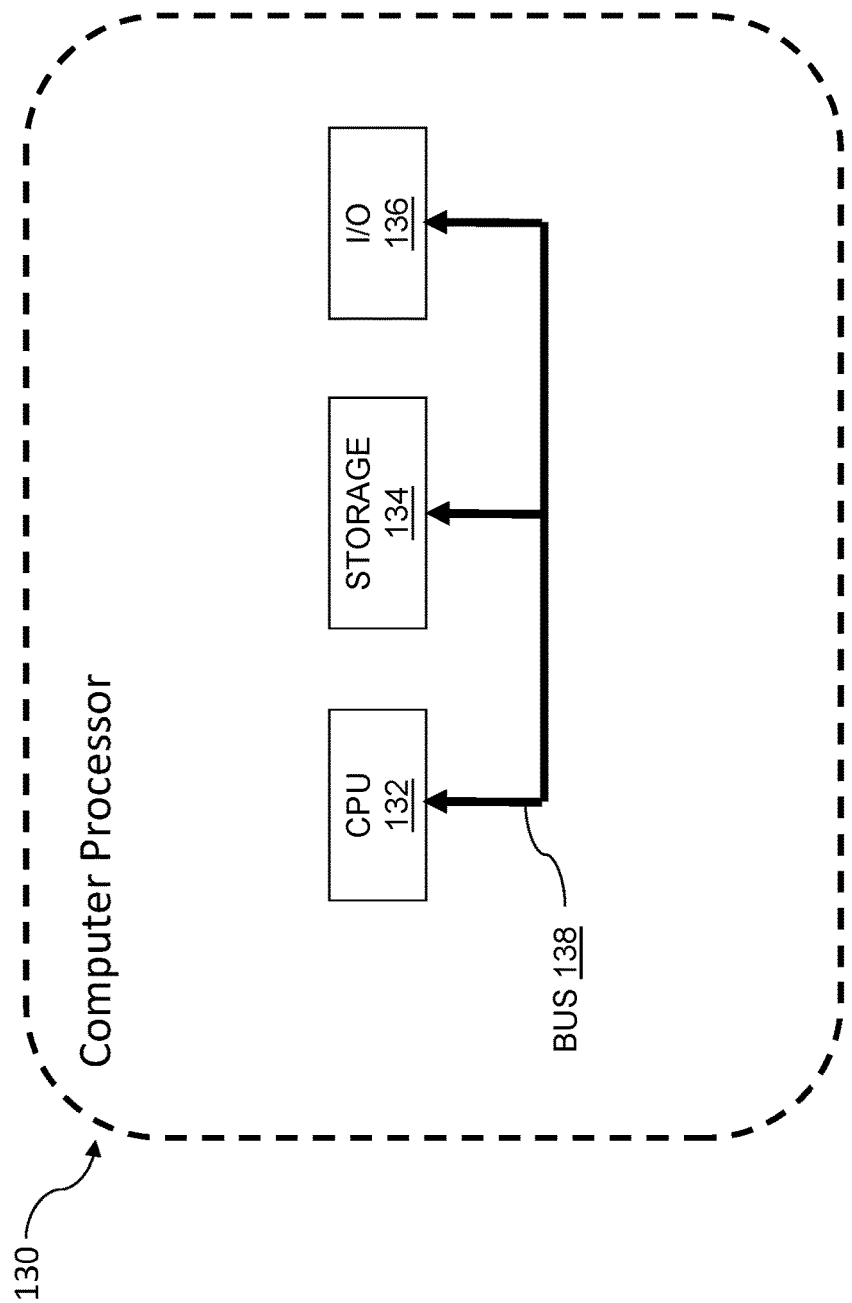
FIG. 13 is a block diagram of a computer system suitable for the operation of embodiments of the present invention.

FIG. 13 is a block diagram of a computer processor 130 suitable for the operation of embodiments of the present invention, or processing modules thereof. A central processor unit (CPU) 132 is communicatively connected to a data store 134 and an input/output (I/O) interface 136 via a data bus 138. The data store 134 can be any read/write storage device or combination of devices such as a random access memory (RAM) or a non-volatile storage device, and can be used for storing executable and/or non-executable data. Examples of non-volatile storage devices include disk or tape storage devices. The I/O interface 136 is an interface to devices for the input or output of data, or for both input and output of data. Examples of I/O devices connectable to I/O interface 136 include a keyboard, a mouse, a display (such as a monitor) and a network connection.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The invention claimed is:

1. A method of managing a digitally-streamed audio communication session between a plurality of user devices, the user devices being configured to send digitally-streamed data indicative of received audio contributions from respective participants in a multiple-participant audio communication session to a multiple-participant audio communication session controller for processing and onward streaming of data indicative of said received audio contributions from said session controller to one or more other user devices for conversion to audio representations for respective other participants of said received audio contributions, the data being streamed between the session controller and the respective user devices in accordance with one or more digital streaming profiles having one or more adjustable digital streaming parameters; the method comprising:

identifying, from streamed data received by said session controller in respect of successive audio contributions from respective participants, time measures indicative of start-times and end-times in respect of said audio contributions;

determining, from time measures identified in respect of a plurality of audio contributions, respective disparity measures, each disparity measure being determined in respect of a preceding audio contribution from one participant and an immediately-succeeding audio contribution from another participant, the disparity measure in respect of a preceding audio contribution and an immediately-succeeding audio contribution being indicative of a disparity between the end-time identified in respect of the preceding audio contribution and the start-time identified in respect of the immediately-succeeding audio contribution; and adjusting one or more digital streaming parameters of the digital streaming profile in accordance with which data is being streamed between the session controller and at least one of the respective user devices in dependence on said disparity measures.

2. A method according to claim 1 wherein the identifying of time measures indicative of start-times and end-times in respect of audio contributions is performed in dependence on analysis including automated voice activity detection.

3. A method according to claim 1 wherein the identifying of time measures indicative of start-times and end-times in respect of audio contributions is performed in dependence on analysis including automated speech recognition.

4. A method according to claim 1 wherein the identifying of time measures indicative of start-times and end-times in respect of audio contributions is performed in dependence on analysis including automated spectrum analysis.

5. A method according to claim 1 wherein the respective disparity measures determined in respect of a preceding audio contribution from one participant and an immediately-succeeding audio contribution from another participant are indicative of gaps and/or overlaps between the respective audio contributions.

6. A method according to claim 1 wherein the adjusting of said one or more digital streaming parameters in accordance with which data is being streamed between the session controller and one or more user devices is performed in dependence on one or more of the following:

the presence of one or more disparity measures indicative of one or more disparities above a predetermined threshold;

the frequency with which disparity measures indicative of disparities above a predetermined threshold have occurred;

the size of one of more disparities indicated by one or disparity measures.

7. A method according to claim 1 wherein the adjusting of said one or more digital streaming parameters comprises adjusting one or more digital streaming parameters affecting one or more of the following:

the data-rate of the data streaming;
the content of the data streamed;
the coding and/or decoding of the data streamed;
the route via which the data is streamed.

8. A method according to claim 1 wherein the method further comprises identifying, from streamed data received by said session controller in respect of audio contributions from respective participants, count measures indicative of the number of participants making audio contributions at different times.

9. A method according to claim 8 wherein the method further comprises adjusting one or more digital streaming parameters of the digital streaming profile in accordance with which data is being streamed between the session controller and at least one of the respective user devices in dependence on said count measures.

10. A method according to claim 1 wherein the audio communication session is an audio-visual communication session and the contributions from respective participants are audio-visual contributions.

11. A method according to claim 1, the method further comprising adjusting one or more audio parameters in respect of the data being streamed from the session controller to at least one of the user devices whereby to affect the audio representation provided by said at least one user device to a participant using said at least one user device, the adjusting of said one or more audio parameters being performed in dependence on said disparity measures.

12. Communication session control apparatus for managing a digitally-streamed audio communication session between a plurality of user devices, the user devices being configured to send digitally-streamed data indicative of received audio contributions from respective participants in a multiple-participant audio communication session to said communication session control apparatus for processing and onward streaming of data indicative of said received audio contributions from said communication session control apparatus to one or more other user devices for conversion to audio representations for respective other participants of said received audio contributions, the data being streamed between the communication session control apparatus and the respective user devices in accordance with one or more digital streaming profiles having one or more adjustable digital streaming parameters; the communication session control apparatus comprising one or more processors being at least configured to:

identify, from streamed data received by said control apparatus in respect of successive audio contributions from respective participants, time measures indicative of start-times and end-times in respect of said audio contributions;

determine, from time measures identified in respect of a plurality of audio contributions, respective disparity measures, each disparity measure being determined in respect of a preceding audio contribution from one participant and an immediately-succeeding audio contribution from another participant, the disparity measure in respect of a preceding audio contribution and an immediately-succeeding audio contribution being indicative of a disparity between the end-time identified in respect of the preceding audio contribution and the start-time identified in a respect of the immediately-succeeding audio contribution; and adjust one or more digital streaming parameters of the digital streaming profile in accordance with which data is being streamed between the control apparatus and at least one of the respective user devices in dependence of said disparity measures.

13. A communication session system comprising a communication session control apparatus according to claim 12 and a plurality of user devices configured to send digitally-streamed data indicative of received audio contributions from respective participants in a multiple-participant audio communication session to said communication session control apparatus.

14. A non-transitory computer-storage medium storing computer program code to, when loaded into a computer system and executed thereon, cause the computer to perform the steps of a method as claimed in claim 1.

15. A communication session control apparatus according to claim 12 wherein the identification of time measures indicative of start-times and end-times in respect of audio contributions is performed in dependence on analysis including automated voice activity detection.

16. A communication session control apparatus according to claim 12 wherein the identification of time measures indicative of start-times and end-times in respect of audio contributions is performed in dependence on analysis including automated spectrum analysis.

17. A communication session control apparatus according to claim 12 wherein the adjustment of said one or more digital streaming parameters comprises adjusting one or more digital streaming parameters affecting one or more of the following:
    the data-rate of the data streaming;
    the content of the data streamed;
    the coding and/or decoding of the data streamed;
    the route via which the data is streamed.

18. A communication session control apparatus according to claim 12 wherein the one or more processors is further configured to identify, from streamed data received by said control apparatus in respect of audio contributions from respective participants, count measures indicative of the number of participants making audio contributions at different times.

19. A communication session control apparatus according to claim 18 wherein the one or more processors is further configured to adjust one or more digital streaming parameters of the digital streaming profile in accordance with which data is being streamed between the control apparatus and at least one of the respective user devices in dependence on said count measures.

* * * * *